Nov. 19, 1968 R. BERNSTEIN ET AL 3,412,338

FREQUENCY FILTER

Filed Oct. 15, 1965 4 Sheets-Sheet 1

INVENTORS

RALPH BERNSTEIN

WINSLOW R. REMLEY

BY David E. Lovejoy

AGENT

United States Patent Office 3,412,338

Patented Nov. 19, 1968

3,412,338

FREQUENCY FILTER

Ralph Bernstein, Rockville, and Winslow R. Remley, Bethesda, Md., assignors to International Business Machines Corporation, Armonk, N.Y., a corporation of New York Filed Oct. 15, 1965, Ser. No. 496,413
12 Claims. (Cl. 328—165)

This invention relates to frequency filters and more particularly to devices for filtering continuous wave signals. Such filters operate to effect signal detection, signal-to-noise ratio enhancement, spectrum analysis, measurement of signal parameters, and filtering. These filters can be used over any frequency range and are typically encountered in the filtering of seismic signals, acoustic signals, and radar signals.

Various types of continuous wave filters are known in the art, but they all have presented one problem or another as will be pointed out in the following discussion of prior art.

One type of prior art filter, employing resonating elements, generally utilizes high Q, L-C circuits which are capable of enhancing the signal-to-noise ratio of signals at a particular frequency. A signal to be analyzed is applied to a large number of the resonant elements, each tuned to a different frequency, and the analysis is carried out by noting which of the elements yields an output. These circuits, however, are inherently bulky and expensive because of the high number of large resonant elements required.

Another type of prior art filter, a heterodyne scanning filter, utilizes a single narrow bandwidth element which is resonant at a fixed frequency. The spectrum of signals to be analyzed is applied to the narrow bandwidth element in a scanning manner by means of a heterodyne circuit which sweeps the spectrum through the resonant frequency. Although the scanning wave filters reduce the number of resonant elements, they are inaccurate because of the difficulty in determining exactly what frequency the signal has been heterodyned to.

Another type of prior art filter, the circulating delay line filter, employs an analog re-circulating loop which generally includes a delay line, a near-unity-gain amplifier, and a summing circuit. An input signal to be analyzed is introduced into the summing circuit, passed to the delay line, next to the amplifier, and back to the summing circuit. This re-circulation around the loop coherently integrates the signal. The output obtained after the coherent integration is indicative of the amplitude of the component in the input signal which has a frequency equal to $1/T$ where T equals the delay time around the loop, that is, T equals the coherent integration storage time. Other prior art embodiments of the re-circulating delay line filter type also utilize heterodyning circuits to provide a fitler capable of analyzing a broad spectrum signal rather than just the single $1/T$ frequency. All of these prior art delay line filters, however, have inherent limitations in their accuracy, resolution, and flexibility.

These limitations in resolution and accuracy arise because resoluton is a function of the loop gain, that is, the closer the gain is to unity the higher the resolution. The closer the gain is made to unity, however, the greater becomes the instability which results from noise perturbations in the re-circulating loop. These noise perturbations are inherently present in analog signals. Because these noise perturbations cause instability as the gain is increased, the resolution of prior art delay line filters is limited. Accuracy, of course, is limited by the resolution.

The flexibility limitation in prior art re-circulating delay line filters arises because the delay time in their analog delay lines cannot be readily changed. Since the delay time cannot be readily changed, their center frequency or detecting frequency cannot be readily changed resulting in an inflexible filter.

Accordingly, it is an object of this invention to filter with very high resolution and accuracy in a manner more economical than can be achieved with prior art filters.

Another object of this invention is to filter in a stable manner with greater resolution and accuracy than can be achieved using prior art re-circulating delay line filters.

A further object of this invention is to filter with a filter device which is more flexible than prior art re-circulating delay line filters.

A still further object of this invention is to filter with a re-circulating delay line filter which can readily scan a whole frequency spectrum.

Another still further object of this invention is to digitally filter a signal in a manner which is independent of the phase of the input signal.

To more fully appreciate the summary statement of the invention hereinafter set forth, the following is a discussion of the operation and advantages of the invention. It should be noted that the present invention concerns a device which will filter a continuous wave component signal of a given frequency from an input signal containing a whole spectrum of frequencies. The frequency, $f_T$, which the filter will detect, is defined as $1/T$ c.p.s. where T is the period of a signal of frequency $f_T$.

In order to detect the presence of the $f_T$ frequency within the whole spectrum of input frequencies, the input signal is band-limited to assure unambiguous detection by a bandpass filter. Next, to eliminate or reduce the dependency of the filter ouptut on the phase of the input component signal of frequency $f_T$, two signals are formed, the first of which is derived directly from the input signal and the second of which is derived after the input signal has been delayed by $T/4$ or phase shifted $\pi/2$ radians. The two signals, the phase shifted and the non-phase shifted signals, are next each sampled and digitalized at a sampling frequency of $1/T$ c.p.s. by an analog-to-digital converter.

After digitalization, the samples of the phase shifted and non-phase shifted signals are digitally coherently integrated. The coherent integration selectively emphasizes the amplitude of the component signal of the input signal which has a frequency $f_T$.

The coherent integrators include digital summing, storage, and multiplication circuits connected in a circulating loop fashion. In operation, each sample of the phase shifted and non-phase shifted signals is added to a respective circulating weighted sum which has been established from the storage and circulation of previous samples. Each new sample is added to the current weighted sum circulating in the loop. After a new sample is added to the current weighted sum, the resultant summation is multiplied by a factor K (less than unity) and stored for a period T thereby forming the next weighted sum which will be added to the next signal sample.

In the present invention as distinguished from prior art filters, the mathematical operations of coherent integration are performed with digital circuitry. This digital circuitry produces digital coherent integration which is not susceptible to instability-causing perturbations which are attendant prior art analog circulating-delay-line filters. Since the digital circuitry does not contain those perturbations, the coherent integration is more stable and, therefore, the coherent integrating loop gain (multiplication factor K) can be made as close to unity as desired so that the resolution of the filter is increased. The higher resolution naturally produces a more accurate filter which is far superior to prior art filters.

A salient advantage of the present filter lies in its flexibility. In order to change the frequency $f_T$ which the filter will detect, it is only necessary to change the sampling frequency $1/T$, the storage time of the coherent integrator T, and possibly the passband of the input bandpass filter. The sampling frequency and storage time can be readily and simply changed by merely changing the output frequency of a frequency generator. The change in the passband of the input filter is also very simple as this bandpass filter is inexpensive and does not have critical characteristics. In comparison, prior art circuits require complex and costly hardware changes in order to change the detection frequency, that is, the center frequency of the filter.

Inherent in the flexible nature of the present filter is the ability to use it as a scanning filter. Since the frequency which the filter will detect is readily changed by changing the sampling and storage times, the filter will operate as a scanning filter if the sampling frequency and the storage time are periodically varied. More particularly, if the sampling frequency is designated as $1/T(t)$ and the coherent integration storage time $T(t)$, then by slowly varying $T(t)$ periodically between certain limits, the filter will detect all frequencies within the reciprocal of those limits.

A further advantage of the present filter is that it does not require an output analog-to-digital converter in order to have its output recorded on digital equipment.

Another advantage accruing from the digital nature of the filter is that it can be constructed in miniaturized form. In miniaturized form, it is more compact than prior art filters which require large and undesirably bulky analog components.

*Summary of invention*

In accordance with one aspect of the present invention, a digital re-circulating delay line filter is provided which includes a re-circulating digital coherent integrating loop. The digital re-circulating loop, because it is digital, allows the loop gain to be higher than heretofore possible thereby providing a filter which has very high resolution and accuracy. In accordance with another aspect of the invention, the coherent integration storage time is readily changed yielding both a flexible filter which has a readily changeable detecting frequency and a filter which can be readily operated in the scanning mode.

The invention also includes a filter which employs digital quadrature processing in order to overcome the phase dependency problem. The quadrature processing is carried out by two paths which include in series an A-to-D converter, a digital coherent integrator, and a rectifying circuit. In order to form the signals for the two paths, there is included angle control circuitry which essentially delays or phase shifts the signal in one path from the one in the other. The quadrature processing is terminated in an adder which sums the signals from the first and second paths to produce a digital filter output which has a major portion of its phase dependency eliminated so that the magnitude of the filter output is substantially independent of the points at which the input signal is sampled.

In summary, the present invention is a digital circulating delay line filter which achieves high resolution, accuracy, and flexibility through digital coherent integration carried out in quadrature.

The foregoing and other objects, features, and advantages of the invention will be apparent from the following more particular description of the preferred embodiments of the invention, as illustrated in the accompanying drawings.

Figure 3A:
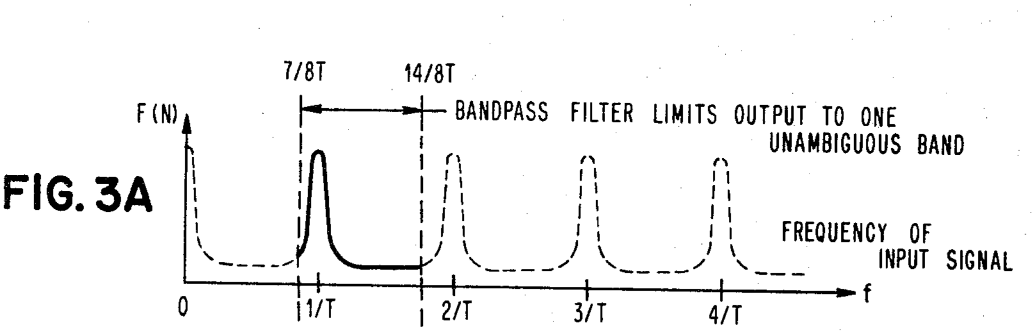
FIG. 3A is a curve which represents the output F(N) of the filter plotted as a function of the input signal frequency.
Figure 3B:
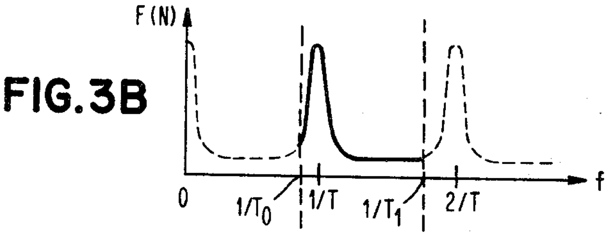
Figure 3C:
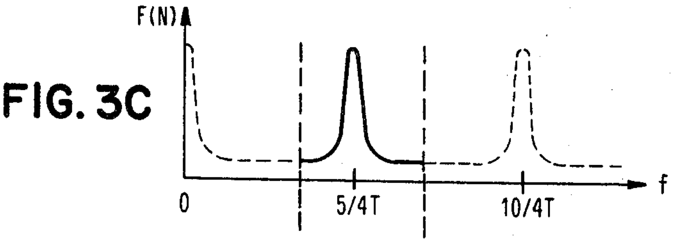
Figure 3D:
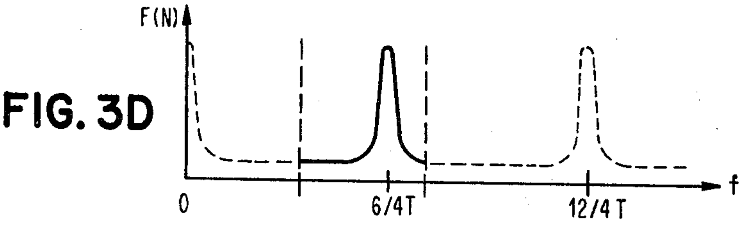

FIGS. 3B, 3C, and 3D are curves which demonstrate the filter output as a function of input signal frequency when the filter is operating in the scanning mode.

Figure 4:
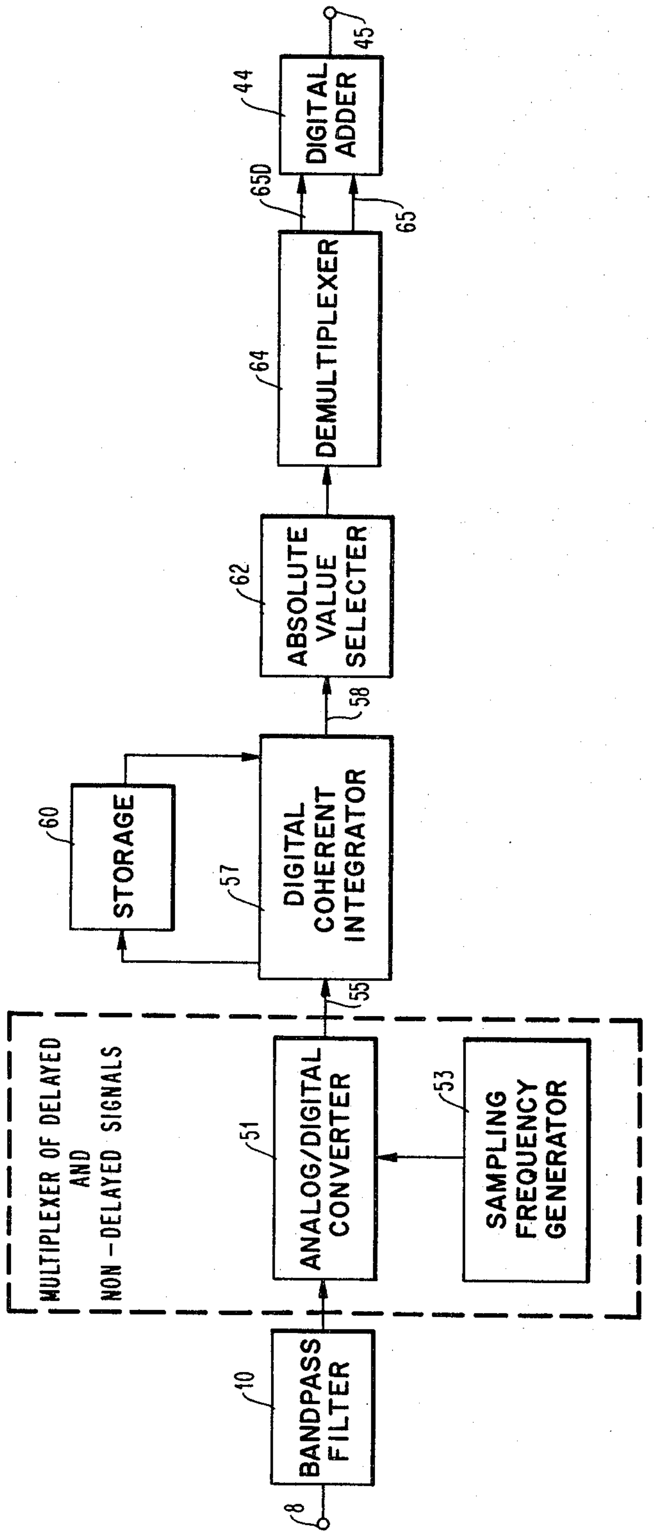

FIG. 4 is a preferred embodiment of the filter incorporating multiplexing, $T/4$ delay, and an absolute value selector.

Figure 5:
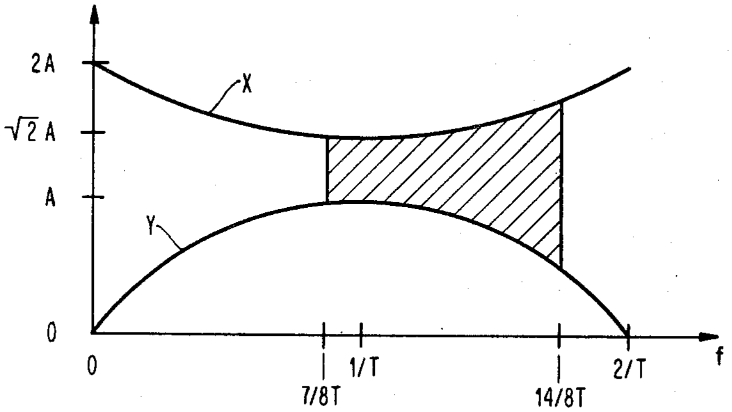

FIG. 5 is a curve representing the amplitude of the numerator of Eq. 17 hereinafter defined as a function of the input signal frequency for different values of $\phi$.

Figure 6A:
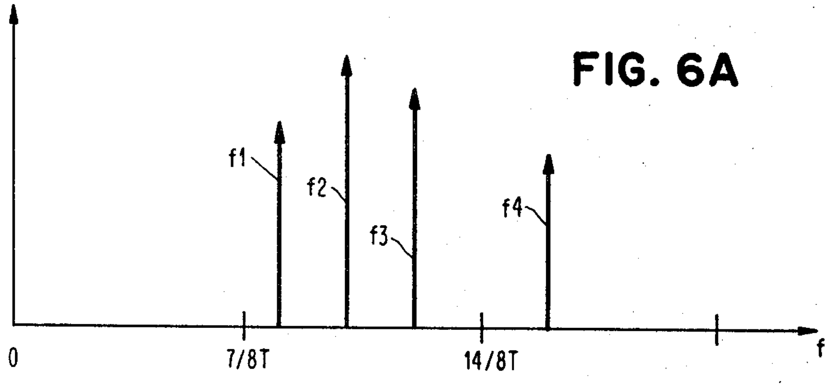

FIG. 6A shows a hypothetical frequency spectrum of an input signal.

Figure 6B:
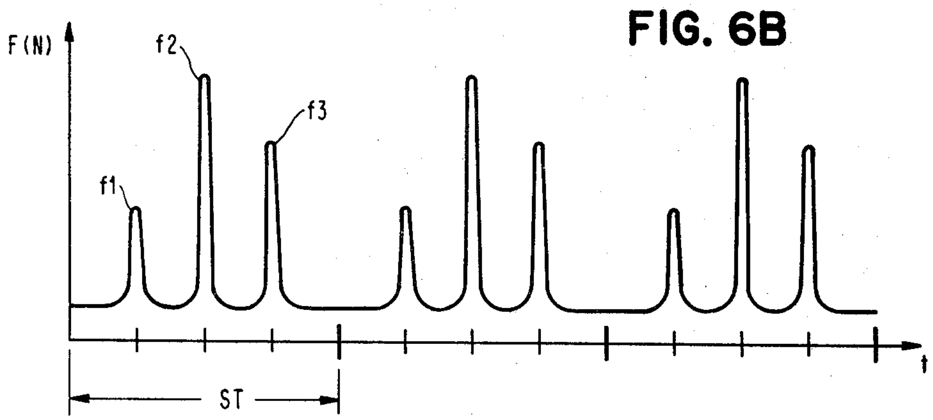

FIG. 6B is a curve representing the output F(N) of the filter as a periodic function of time when the filter is operating in the scanning mode.

Figure 1:
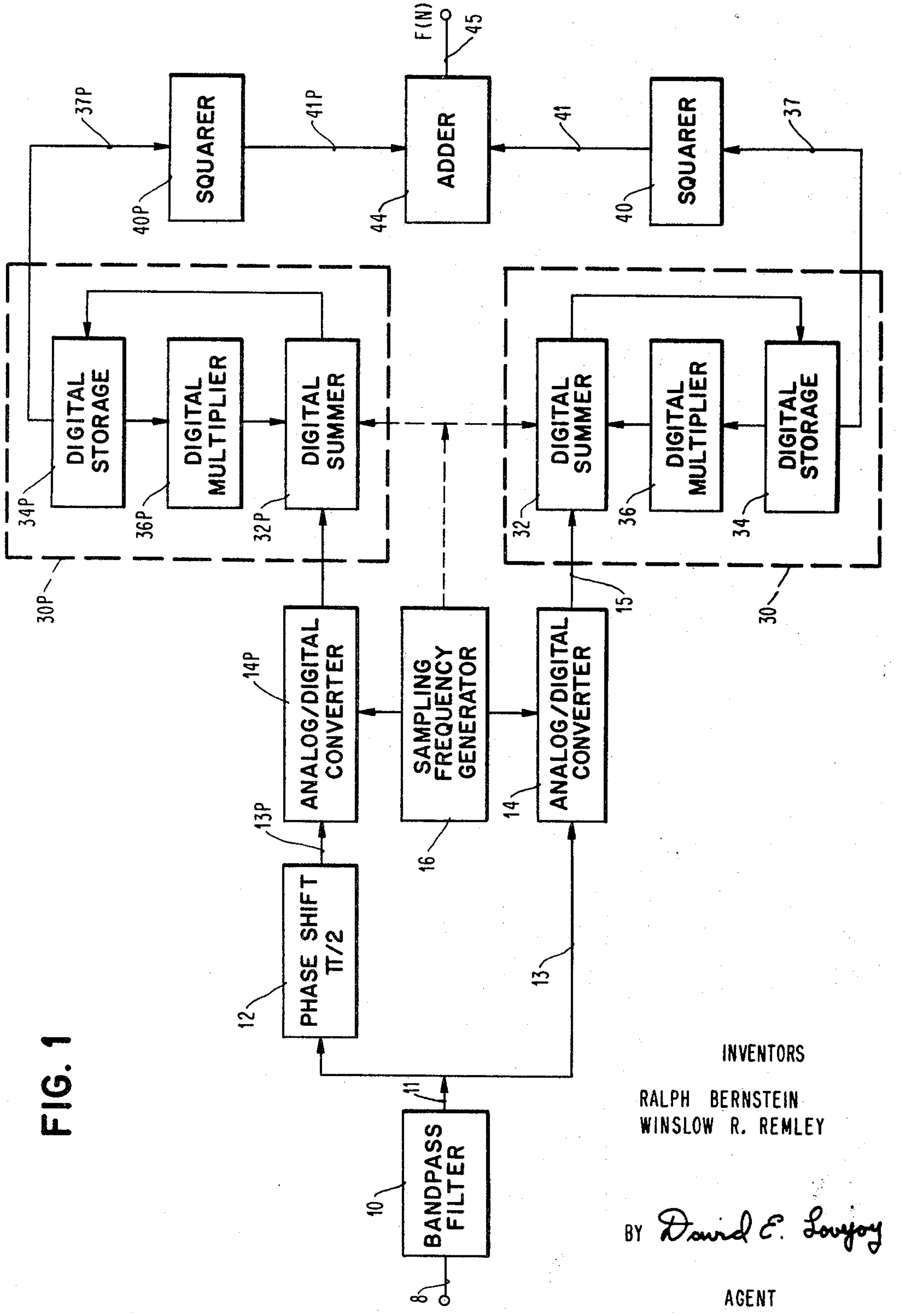
FIG. 1 is the filter shown in a block diagram form which demonstrates the principles upon which the filter operates.

*Fig. 1 circuit*

FIG. 1 shows an embodiment of the invention which is particularly suitable for explaining the operation of the invention. An input signal containing a spectrum of frequencies to be filtered is supplied to bandpass filter 10 and the filtered output appears after adder 44. The output of the filter is in the form of a periodic train of digital numbers. The amplitudes of the digital numbers are indicative of the magnitude of that frequency component in the input signal spectrum which has a frequency equal to the detection frequency $f_T$ of the filter.

The input bandpass filter 10 is a conventional filter capable of limiting the input signal to a range of frequencies which surrounds the detection frequency $f_T$. The characteristics of this bandpass filter are not critical and in some instances the filter may not be necessary at all. In general, to avoid ambiguous detection, a filter is used with a passband in which the highest frequency is less than twice the lowest. The output of filter 10 is connected to a conventional analog-to-digital converter 14 and to a wideband 90° phase shift circuit 12. All of the circuit elements in the phase shift path beginning with phase shift circuit 12 are numbered the same as like elements in the non-phase shifted path with an additional "P" designation. For example, analog-to-digital converter 14P corresponds to converter 14.

The wideband 90° phase shift circuit 12 must be able to shift by 90° all the component signals of the input signal which are passed by filter 10. Circuit 12, therefore, can be any wideband phase shift circuit which performs that function, a particular example of which is discussed in the article by O. G. Villard, Jr., "Cascade Connection of 90° Phase Shift Networks," appearing in the Proceedings of the IRE, vol. 40, No. 3 (March 1952), pp. 334 to 337.

The analog-to-digital converters 14 and 14P are conventional circuits which sample the signals at 13 and 13P, respectively, and convert them to digital form at a sampling rate T which is controlled by the sampling frequency generator 16.

Sampling frequency generator 16 can be any conventional frequency generator or equivalent control circuit. In one embodiment of the invention, however, generator 16 must be capable of producing an output frequency which scans between the frequencies $X/T$ and $Y/T$, the spectrum over which the filter analyzes, where X and Y are positive real numbers.

It should be noted that the phase shift circuit 12, the converters 14 and 14P, and the generator 16 all together constitute a sampling means which includes an angle control means ("angle" to be hereinafter described).

To coherently integrate the output of the analog-to-digital converters, analog-to-digital converters 14 and 14P are connected to digital coherent integrators 30 and 30P, respectively. The integrators 30 and 30P include therein digital summers 32 and 32P, for digitally summing a signal from the analog-to-digital converters with a weighted sum signal to be hereinafter described. The digital summers 32 and 32P are connected to digital storage means 34 and 34P which are in turn connected to digital multiplier means 36 and 36P, respectively. The digital multipliers are also connected to the digital summers 32 and 32P thereby forming independent circulating loops which include circuits 32, 34, 36 on one hand and 32P, 34P, 36P on the other. These loops store and circulate the weighted sum signal referred to above. The digital storage, multiplier, and summer means can be any conventional circuitry such as shift registers capable of performing the operations indicated. The order in which those operations are performed, of course, may be changed. For example, multiplication could occur before storage. The timing of the storage, multiplying, and summing operations may be controlled by the sampling frequency generator 16 or any other conventional control means.

In order to complete the quadrature processing which was initiated by the formation of the phase shifted and non-phase shifted paths after bandpass filter 10, coherent integrators 30 and 30P are connected to squaring circuits 40 and 40P, respectively, which are in turn connected to adder 44. The squaring circuits are conventional rectifying digital circuitry. Adder 44 is also conventional digital circuitry.

*FIG. 1 operation at a single frequency*

Figure 2:
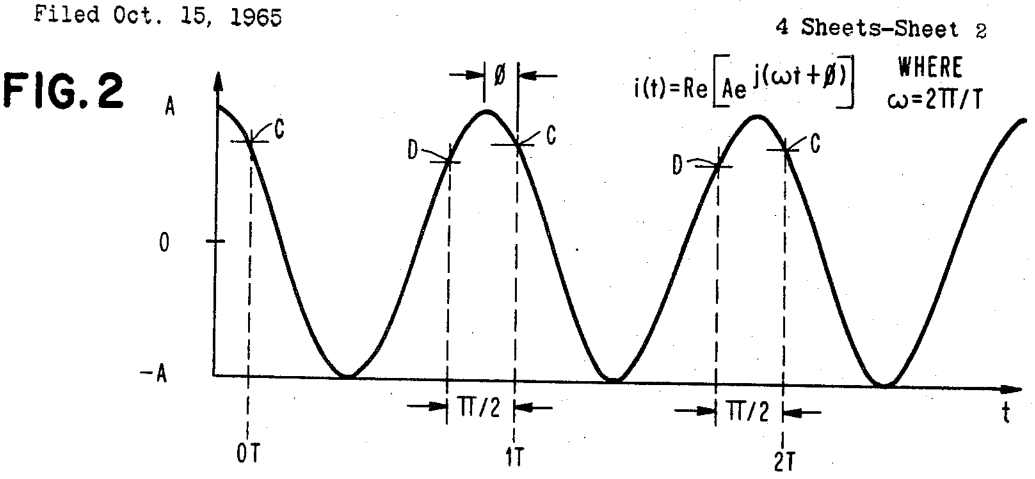
FIG. 2 is a curve representing a hypothetical input signal of frequency $1/T$ and its relationship with the time at which it is sampled.

The operation of the circuit in FIG. 1 will be explained letting $i(t)$ be the input signal which is applied to input terminal 8 where, $$i(t)=Re[Ae^{j(\omega t+\phi)}] \qquad \text{Eq. (1)}$$

and where:

$\omega=(2\pi f)$ where "$f$" is the frequency of the input signal
$t$=time
$A$=amplitude of input signal
$\phi$=phase angle (used to designate the angle by which the sampling point differs from a point of maximum amplitude, see FIG. 2)
"$Re[\ ]$" denotes the "real part of" the enclosed expression Assuming the frequency of the input signal $i(t)$ is within the passband of filter 10, $i(t)$ appears at terminal 11 and is sampled by analog-to-digital converter 14. In FIG. 2, the points are shown at which converter 14 takes samples of $i(t)$ as measured with respect to the angle of the component signal of frequency $1/T$. The samples are taken at times 0T, 1T, 2T . . ., where the sampling time is some arbitrary number of radians $\phi$ from the peak amplitude as shown.

For the purposes of this invention, "angle of the component signal of frequency $1/T$" will be used to denote periodic points along a curve of that signal. The angle is determined generally by the expression $j(\omega t+\phi+z)$ which is a general expression for the exponent in Eq. 1 and in which $z$ may equal $\pi/2$, $(-\omega T)/4$, or other values. The points which occur when the component signal of frequency $1/T$ is at a first angle might be, for example, points "C" at 0T, 1T, 2T . . . in FIG. 2. The points which occur when the component signal of frequency $1/T$ is at a second angle might be points D in FIG. 2. The term "angle" for the purposes of this invention is therefore meant to describe anything consistent with the above discussion.

Referring again to FIG. 1, the signal $i(t)$ at terminal 11 after bandpass filter 10 is phase shifted 90° by circuit 12 and appears as a phase shifted signal at terminal 13P in the following form, $$i(t)=Re[Ae^{j(\omega t+\phi+\pi/2)}] \qquad \text{Eq. (2)}$$

For the sake of clarity, the description hereafter will be given only with reference to the non-phase shifted signal of Eq. 1 since the processing is identical for the phase shifted signal of Eq. 2.

The signal $i(t)$ at 13 is sampled by the analog-to-digital converter 14 at a sampling frequency $1/T$. After sampling and digitalizing, the output appears at 15 in the form of a digital signal. The signal at 15 will have a value which is equal to the amplitude of $i(t)$ in Eq. 1 evaluated at $t$ where $t=NT$ and where $N=0, 1, 2, 3 \ldots$, so that I(0) would be the value of $i(t)$ at time $t=0$, I(1) would be the value at $t=T$, I(2) would be the value at $t=2T$, and so on. Using this notation, the output at 15 after a first sample is taken would be, at some arbitrary time:

$$I(0)=Re[Ae^{j(0+\phi)}] \qquad \text{Eq. 3}$$

The digital number I(0) would be read into the coherent integrator 30 at a time $t=0$ where it would be summed by summer 32 with any previous weighted sum in the digital storage 34. Assuming, however, that I(0) is the first digitalized number there would be no weighted sum in the digital storage 34 so that I(0) itself would be put into digital storage for a period T. I(0) would be then multiplied by a factor "K" less than unity by digital multiplier 36 to form a new weighted sum which is added in digital summer 32 to the next number I(1) coming from the analog-to-digital converter 14. In a similar manner, this operation continues for each new number I(N) so that the output R(N) at 37 would be derived from the following equations:

$$R(0)=Re[Ae^{j\phi}]$$
$$R(1)=Re[Ae^{j\phi}(e^{j\omega T}+K)]$$
$$R(2)=Re[Ae^{j\phi}(e^{j\omega 2T}+Ke^{j\omega(2T-T)}+K^2)]$$
$$R(3)=Re[Ae^{j\phi}(e^{j\omega 3T}+Ke^{j\omega(3T-T)}+K^2e^{j\omega(3T-2T)}+K^3)]$$
$$\vdots$$
$$R(N)=Re[Ae^{j\phi}(e^{j\omega(NT)}+Ke^{j\omega(NT-T)}+\ldots+K^N)]$$

The above expression for R(N) can be simplified in the following manner, $$R(N)=ReAe^{j\phi}\sum_{n=0}^{N}K^ne^{j\omega(NT-nT)}$$

$$R(N)=ReAe^{j(\phi+\omega NT)}\sum_{n=0}^{N}(Ke^{-j\omega T})^n \qquad \text{Eq. (4)}$$

By using in Eq. 4 the relationship, $$\sum_{n=0}^{N}x^n=\frac{1-x^{(N+1)}}{1-x} \qquad \text{Eq. (5)}$$

the output at 37 from the coherent integrator 30 is, $$R(N)=Re\left[Ae^{j(\omega NT+\phi)}\frac{1-K^{(N+1)}e^{-j\omega(N+1)T}}{1-Ke^{-j\omega T}}\right] \qquad \text{Eq. (6)}$$

As N becomes larger $K^{(N+1)}$ approaches zero because $|K|<1$ and R(N) in Eq. 6 is to a good approximation, $$R(N)=Re\left[\frac{Ae^{j(\omega NT+\phi)}}{1-Ke^{-j\omega T}}\right] \qquad \text{Eq. (7)}$$

which in another form is, $$R(N)=\frac{A\cos(\omega NT+\phi)-K\cos(\omega NT+\phi-\omega T)}{1+K^2-2K\cos\omega T} \qquad \text{Eq. (8)}$$

By a similar analysis, the output $R_p(N)$ of the phase shifted coherent integrator 30P on line 37P can be shown to be, $$R_p(N)=\frac{A\sin(\omega NT+\phi)-K\sin(\omega NT+\phi-\omega T)}{1+K^2-2K\cos\omega T} \qquad \text{Eq. (9)}$$

The digital numbers R(N) and $R_p(N)$ are next squared in circuits 40 and 40P, respectively, and thereafter are added in adder 44. The added signals produce a filter output F(N) at terminal 45 which is given by the following:

$$F(N)=R(N)^2+R_p(N)^2=\frac{A^2}{1+K^2-2K\cos\omega T} \quad \text{Eq. (10)}$$

In Eq. 10, F(N) is a digital number which changes periodically with time intervals T. The output as indicated in Eq. 10 is independent of the phase angle $\phi$ of the input signal. The phase dependency, as indicated by $\phi$, was eliminated by the squaring and summing operations as is apparent from comparing Eqs. 8 and 9 with Eq. 10.

When the sampling frequency $1/T$ is equal to the frequency $f$ of the input signal, the output of the filter F(N) reaches a maximum as indicated by the following expression, $$F(N)=\frac{A^2}{(1-K)^2} \quad \text{Eq. (11)}$$

when $\omega T=n2\pi$
where $n$=any integer $\omega=2\pi f$

The processing of the input signal is effectively linear until the squaring operation is reached in squarers 40 and 40P. Since the processing is linear the superposition theory applies; and, therefore, the filter will operate when the input at terminal 8 contains many component signals representing a plurality of frequencies.

Each branch of the circuit of FIG. 1, that is, the phase shifted branch up to the point 37P and the non-phase shifted branch up to the point 37, is a linear resonate circuit having a power transfer function (PTF) as given by, $$PTF=\frac{1}{1+K^2-2K\cos\omega T} \quad \text{Eq. (12)}$$

In accordance with the article by W. Remley entitled, "The Coherent Memory Spectrum Analyzer With Loop Gain $K<1$," Proc. of the IRE, September 1962, vol. 50, No. 9, pp. 1984–1985, the resolution of a filter having the power transfer function of Eq. 12 in terms of the equivalent rectangular bandwidth $W_e$ is given by the following:

$$We=\left(\frac{1-K^2}{1+K^2}\right)\left(\frac{1}{T}\right)\text{c.p.s.} \quad \text{Eq. (13)}$$

It is apparent from Eq. 13 that the resolution of the filter is a function of the coherent integrating loop gain K which is simply the multiplication factor of the digital multipliers 36 and 36P. It is also apparent from Eq. 13 that the closer K is made to unity the narrower the equivalent rectangular bandwidth $W_e$ becomes, or in effect, the higher the resolution of the filter.

FIG. 3A demonstrates the power response or the digital output F(N) as a function of the frequency of the input signal "$f$" as defined by Eq. 11 above. In FIG. 3A, it can be seen that the output peaks when the input signal has a frequency equal to $1/T$. It is also apparent that the output will peak at integral multiples of $1/T$, that is, whenever $\omega T=n2\pi$ where $n$ is any integer. To eliminate the ambiguous detection, the bandpass filter 10 is utilized to limit the detection to one unambiguous band as shown in FIG. 3A as occurring between $7/8T$ and $14/8T$ although some higher passband could be chosen.

The shape of the power response is presented in FIG. 3A only for the purpose of explanation and is not meant to contain any information relative to the resolution which is obtainable with the present invention. The resolution of the filter can be made extremely high as is apparent from Eq. 13. Although prior art circuits have been limited in their resolution because of an inability to increase the loop gain K, the present circuit employing digital circuitry is not so limited as it contains no instability-causing perturbations.

*Fig. 1 Scanning filter operation*

It has been previously assumed that in FIG. 1 the sampling frequency has been a constant value, $1/T$, and that the storage time in the coherent integrators 30 and 30P has also been a constant, T. The filter used in that manner with constant values for T will only analyze for a single frequency $1/T$ with a resolution as previously defined by the equivalent bandwidth $W_e$. The filter of the present invention is more flexible, however, and will operate as a scanning filter if T is varied periodically between limits. Hereinafter, T will be designated as a function of time $T(t)$ which varies between the limits of $T_1$ and $T_0$ and which therefore causes the filter to scan the input signal to detect only those component signals having frequencies appearing in the range from $1/T_0$ to $1/T_1$.

Referring to FIGS. 3B, 3C, and 3D, the filter output F(N) is shown where the sampling frequency $1/T(t)$ and the storage time $T(t)$ of the coherent integrators are varied by means of the sampling frequency generator 16. In FIGS. 3B, 3C and 3D as in FIG. 3A the bandpass filter limits the input, and therefore the output, to the frequency range between $1/T_0$ and $1/T_1$ where $$T_0=(8T)/7$$

and $T_1=(8T)/(14)$. FIG. 3B shows the output when the input contains a component of frequency equal to $1/T$. FIG. 3C shows the output when the input signal contains a component of frequency equal to $5/(4T)$. In a similar manner, FIG. 3D shows the output when the input signal contains a component of frequency equal to $6/(4T)$.

The manner in which $T(t)$ is varied from $T_0$ to $T_1$ is flexible, but there is an upper limit on the maximum permissible rate of variation since the filter must have time to respond before it is changed to a new frequency. The criterion for varying the sampling frequency is dependent upon the value of the parameter K which in turn determines the resolution of the filter. More particularly, it can be shown that the change in center frequency, $$\frac{d\left(\frac{1}{T(t)}\right)}{dt}$$

should obey the following inequality:

$$\left|\frac{d\left(\frac{1}{T(t)}\right)}{dt}\right| \ll \frac{(1-K)^2}{T(t)^2}$$

or more simply, $$\left|\frac{dT(t)}{dt}\right| \ll (1-K)^2 \quad \text{Inequality (A)}$$

According to the preferred embodiment, the variation of $T(t)$ must comply with Inequality (A). If $T(t)$ is varied linearly, K may be a constant; but if $T(t)$ is varied exponentially (for example, log frequency scale) then K should be varied also to comply with the requirements of Inequality (A).

*Fig. 4 Circuit*

FIG. 4 is a circuit according to a preferred embodiment of the present invention. The FIG. 4 circuit differs from the FIG. 1 circuit in a number of beneficial ways. In particular, by multiplexing the signals only one analog-to-digital converter and one digital coherent integrator are required rather than two as in the FIG. 1 embodiment. A second major difference is that an absolute value selector is substituted for the squaring circuits of FIG. 1. The third major change is the elimination of the wideband $\pi/2$ phase shift circuit. In its place, a $T/4$ delay is preferred. More details relating to these changes and to their effects on the filter operation will become apparent from the following description of the FIG. 4 embodiment of the invention.

Input terminal 8 and bandpass filter 10 are the same as in the FIG. 1 circuit. Also, at the output, digital adder 44 having an output terminal 45 is the same as the adder in the FIG. 1 embodiment. Bandpass filter 10 is connected to analog-to-digital converter 51 which differs from the analog-to-digital converter 14 of FIG. 1 in that it must function to take two samples both at a frequency of $1/T$ c.p.s.; but where one sample is $T/4$ seconds behind the other. The timing for the sampling period is controlled by a sampling frequency generator 53.

Sampling frequency generator 53 must produce two outputs, the first at a frequency $1/T$ and the second at a frequency $1/T$ but delayed $T/4$ seconds behind the first. Many conventional control circuits will perform this function. One such circuit includes a signal generator which generates a frequency of $4/T$ c.p.s. and which drives two serially connected flip-flops. The output after the second flip-flop is $1/T$ c.p.s. and is used as the first output. To derive the second output delayed by $T/4$, the signal from the second flip-flop is fed through a LATCH circuit to one input of an AND circuit. The other input to the AND would come from the $4/T$ generator. The signal from the AND would feed back to reset the latch. The second output from the AND would be at a frequency of $1/T$ and delayed $T/4$ seconds behind the first $1/T$ output derived from the second flip-flop.

It should be noted that converter 51 and generator 53 can be broadly defined as sampling means where the sampling means includes angle control means and sampling frequency control means which in one embodiment includes the flip-flop, AND, and LATCH circuits which were described with reference to generator 53. Of course, many other similar circuits will be apparent to those skilled in the art.

The signal on the output terminal 55 of analog-to-digital converter 51 would be in multiplexed form. The multiplexing is achieved by any conventional time multiplexing technique. One such way of multiplexing results automatically from the way in which samples are taken in A-to-D converter 51. Since the two series of samples, the non-delayed samples and the delayed samples, are taken at times separated by $T/4$, the output of A-to-D converter 51 will automatically be time multiplexed.

The multiplexed output of converter 51 feeds digital coherent integrator 57 which functions as the digital coherent integrator 30 of the FIG. 1 embodiment except that it operates on a time-sharing basis to process the delayed signal and the non-delayed signal. A conventional digital storage 60 is connected to digital coherent integrator 57.

The storage 60 is required since the digital coherent integrator 57 works on a multiplexed basis. Since coherent integration requires the addition of a weighted sum to each newly received sample, there must be a storage location for the weighted sum of the delayed signal while the non-delayed signal is being processed and vice versa. Storage means 60 includes any conventional storage (such as digital storage 34 in FIG. 1) which will alternately store the multiplexed signal which is not currently being processed.

Storage means 60 will also include conventional control circuitry which operates with generator 53 to control the multiplexing operation of the coherent integrator 57. One way of implementing the coherent integrator 57 and storage 60 combination would be to have a coherent integrator such as 30 in FIG. 1 which has in parallel with storage 34 the additional storage 60. The input from summer 32 would have means for switching from one storage to the other alternately with the delayed and non-delayed samples.

The digital coherent integrator 57 is connected to an absolute value selector 62 which takes the place of the squaring circuits 40 and 40P in FIG. 1. The absolute value selector is simply a circuit which will drop the sign of the digital numbers coming from the coherent integrator 57. Absolute value selector 62 is connected to a demultiplexer 64 which is a conventional circuit for time demultiplexing the delayed and non-delayed signals so that they appear in synchronism at terminals 65 and 65D, the inputs to digital adder 44.

*Operation of the FIG. 4 circuit*

Although the FIG. 4 filter does not completely eliminate the phase dependency as does the FIG. 1 circuit, it does to a major extent. In both the FIG. 1 and FIG. 4 circuits, the input signal to be filtered is sampled at the same frequency as the component signal which the filter will detect. With reference to FIG. 2 it will be recalled that if only one sample is taken of an input cosine wave of frequency $f_T$ and peak amplitude A, there is a random chance that that sample would be taken at the zero amplitude level of that cosine wave. If the input signal exists such that the component signal of frequency $f_T$ is sampled at the zero amplitude level, then the filter will not detect the presence of the component signal of frequency $f_T$. The particular arbitrary spot between maximum amplitude A and zero amplitude where the sample is taken is defined by the phase angle $\phi$. To eliminate the dependency of the filter output on the phase angle $\phi$, the FIG. 1 circuitry utilized a 90° wideband phase shift circuit to achieve quadrature processing. The quadrature processing was completed by squaring and adding so as to completely eliminate any dependence of the filter output on the phase angle $\phi$.

Although the FIG. 4 circuitry on the other hand, does not completely eliminate the phase dependency due to the fact that a $T/4$ delay is used rather than a $\pi/2$ wideband phase shift circuit and due to the fact that an absolute value selector is used rather than a squaring circuit, acceptable operation is achieved. The specific effects of using these substitutions will become apparent in the following detailed description of the FIG. 4 operation.

If the input signal at terminal 8 in the FIG. 4 circuit is the same signal as previously given Eq. 1, then it can be shown that the output at terminal 58 of digital coherent integrator 57 for the non-delayed signal will be the same as Eq. 7 which can be written as follows:

$$R(N)=\frac{A\cos(\omega NT+\phi)}{1-K\cos\omega T} \tag{14}$$

In a similar manner the output $R_D(N)$ of the coherent integrator for the delayed signal can be shown to be, $$R_D(N)=\frac{A\cos(\omega(NT-T/4)+\phi)}{1-K\cos\omega T} \tag{15}$$

Of course, the signals as expressed by Eq. 14 and Eq. 15 exist at the output of digital coherent integrator 57 on a time multiplexed basis, but this multiplexing has no effect on the final output F(N) of the filter. The absolute values of the signals as given by Eq. 14 and Eq. 15 are taken in absolute value selector 62 and thereafter demultiplexing occurs in demultiplexer 64. Digital adder 44, therefore, has a filter output F(N) given by the following:

$$F(N)=|R(N)|+|R_D(N)| \tag{16}$$

$$F(N)=\frac{|A\cos(\omega NT+\phi)|+|A\cos(\omega(NT-T/4)+\phi)|}{1-K\cos\omega T} \tag{17}$$

where with input signals of the form, $A\cos(\omega t+\phi)$, $\omega=2\pi f$
$f$=frequency
$A$=amplitude
$\phi$=phase angle by which the sampling point varies from the maximum amplitude of an input component signal of frequency $1/T$
$T$=sampling period
$t=NT$, where $N=0, 1, 2, 3 \ldots$ It is evident from examining Eq. 17 that the filter output in the FIG. 4 circuit is not completely independent of the phase angle $\phi$ as was the filter output for the FIG. 1 circuit as given in Eq. 11. Although the filter output is not completely independent of the phase angle, the error which is introduced into the filter output is acceptable in most situations so that the saving in hardware realized by using the FIG. 4 rather than FIG. 1 circuit is justified.

FIG. 5 is a plot of the amplitude (ordinate) of the numerator of Eq. 17 as a function of the input signal frequency (abscissa) for different values of $\phi$. The upper curve X is the limit for the maximum value of the numerator for any value of $\phi$. The lower curve Y is the minimum value for the numerator for any value of $\phi$. The amplitude of the numerator varies anywhere between the maximum and minimum values depending on the value of $\phi$ which is arbitrary and uncontrollable. If the passband of input filter 10 is selected between $7/(8T)$ and $14/(8T)$, then the numerator term will be constrained within the shaded area of FIG. 5. The variation in the numerator term, when compared with the variation in the denominator in Eq. 17, is very small so that excellent filter operation is achieved in spite of the dependency on $\phi$.

While the $T/4$ delay is the preferred amount of delay, it will be realized that different values of delay could be used; but that these different values would naturally produce a more phase dependent output. Any value of delay between zero and T (not inclusive of zero or T) except $T/2$ could be used. The $T/4$ delay between samples is preferred, however, because it is the value which results in the least phase dependency.

Although the preferred embodiment of the invention uses an absolute value selector as indicated in the FIG. 4 circuit, it is apparent that other circuits will also work. The important requirement is that rectification occurs, that is, all negative values are made positive. The squaring circuit of FIG. 1 also makes all negative values positive, but in addition it increases the amplitude by the square. It will be apparent to those skilled in the art that any operation which changes negative values to positive, irrespective of what it does to the amplitude, can be suitably used in place of the preferred absolute value selector.

The FIG. 4 circuit will, of course, operate in the scanning mode. In the scanning mode, T in Eq. 17 would be changed to $T(t)$. $T(t)$ would vary over a frequency range say from $7/(8T)$ to $(14)/(8T)$. The variation of $T(t)$ in the FIG. 4 embodiment should also vary according to Inequality (A). FIG. 6A shows a hypothetical frequency spectrum of an input signal. The spectrum includes frequencies $f_1$, $f_2$, and $f_3$ within the detecting passband over which $T(t)$ will vary. The input spectrum also contains a frequency $f_4$ which is outside that passband.

FIG. 6B represents the output of the filter F(N) as a function of time operating in the scanning mode with an input signal containing the spectrum of FIG. 6A. The amount of time it takes $T(t)$ to vary between $(8T)/7$ and $(8T)/14$ is designated as the scanning time, ST. The output of the filter F(N) as seen in FIG. 6B is periodic in ST and has outputs at points in time which correspond to the input frequencies $f_1$, $f_2$, and $f_3$. Note that $f_4$ does not appear in the output signal.

Those skilled in the art will realize that many variations are included within the present invention. One such variation for smoothing the filter output would include a subsequent integrator after output adder 44. Also, although it was indicated in the description of the FIG. 4 circuit that the $T/4$ delay would be achieved by sampling the input at two different times, a circuit which operates on the same principles would be achieved if the $\pi/2$ phase shift circuit of FIG. 1 were simply replaced by a $T/4$ delay circuit.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for filtering a preselected component signal of frequency $1/T$ from an input signal comprising:

sampling means for periodically samping the input signal at a sampling frequency $1/T$; said sampling means including, analog-to-digital converter means and, angle control means connected to said converter means so as to cause said converter means to derive periodic first samples from said input signal when said component signal is at a first angle and to derive periodic second samples from said input signal when said component signal is at a second angle;

digital coherent integrating means serially connected to the sampling means for coherently integrating said first and second samples utilizing an integration storage time T so as to form integrated first and second samples, respectively;

rectifying means connected to the coherent integrating means for rectifying said integrated first and second samples to form rectified first and second samples, respectively; and summing means connected to the rectifying means for summing said rectified first and second samples, an output signal being formed by the summing means which has a magnitude which is substantially independent of the angle of said component signal; said output signal thereby being indicative of the amplitude of that component signal in the input signal having a frequency $1/T$.

2. The circuit of claim 1 wherein said angle control means includes a $\pi/2$ wideband phase shift network for phase shifting the input signal to form a phase shifted signal from which said periodic second samples are derived.

3. The circuit of claim 1 wherein said angle control means includes a $T/4$ delay network for delaying the input signal to form a delayed signal from which said periodic second samples are derived.

4. The circuit of claim 1 wherein said angle control means includes circuit means for generating first control pulses to cause said first samples to be taken at said first angle, and for generating second control pulses delayed $T/4$ from said first control pulses to cause said periodic second samples to be taken at said second angle.

5. The circuit of claim 1 wherein said coherent integrating means includes a digital summer, a digital multiplier, and a digital storage all connected in a loop such that said samples are summed in said digital summer with a circulating weighted sum, are multiplied in said digital multiplier by a constant less than unity to form a new weighted sum, and are stored in said digital storage for a time totalling T.

6. The circuit of claim 2 wherein said rectifying means includes a squaring circuit.

7. A circuit operative to scan over the frequency range $X/T$ to $Y/T$ so as to filter a component signal of instantaneous frequency $1/T(t)$ from an input signal comprising:

sampling means for periodically sampling the input signal at frequencies over the range $X/T$ to $Y/T$; said sampling means including:

analog-to-digital converter means, sampling frequency control means for varying the instantaneous frequency $1/T(t)$ over the range $X/T$ to $Y/T$, and angle control means connected to said converter means to cause said converter means to derive periodic first samples from said input signal when said component signal is at a first angle, and to derive periodic second samples when said component signal is at a second angle;

digital coherent integrating means serially connected to the sampling means for coherently integrating said first and second samples with an integration storage time T($t$) which varies from $T/X$ to $T/Y$ so as to form integrated first and second samples, respectively;

rectifying means for rectifying said integrated first and second samples to form rectified first and second samples, respectively; and summing means connected to the rectifying means for summing said rectified first and second samples to form an output signal having a magnitude which is substantially independent of the angle of said component signal; said output signal thereby being indicative of the amplitude of that component signal in the input signal having instantaneous frequency $1/T(t)$.

8. The circuit of claim 7 wherein said angle control means includes a $\pi/2$ wideband phase shift network for phase shifting the input signal to form a phase shifted signal from which said periodic second samples are derived.

9. The circuit of claim 7 wherein said rectifying means includes an absolute value selector.

10. The circuit of claim 7 wherein said angle control means includes circuit means for generating first control pulses to cause said first samples to be taken at said first angle, and for generating second control pulses delayed $T(t)4$ from said first control pulses to cause said second samples to be taken at said second angle.

11. The circuit of claim 8 wherein said rectifying means includes a squaring circuit.

12. The circuit of claim 10 wherein said coherent integrating means includes a digital summer, a digital multiplier, and a variable storage time digital storage all connected in a circulating loop such that said samples are summed in said digital summer with a circulating weighted sum, are multiplied by a constant less than unity in said digital multiplier, and are stored for a time which totals T($t$) in said digital storage.

References Cited

UNITED STATES PATENTS 3,086,172 4/1963 Johnson ---------- 328—165 XR
3,314,015 4/1967 Simone ------------ 328—165

ARTHUR GAUSS, *Primary Examiner.*

S. T. KRAWCZEWICZ, *Assistant Examiner.*